US012739556B2

(12) United States Patent
Kaetel

(10) Patent No.: US 12,739,556 B2
(45) Date of Patent: Sep. 15, 2026

(54) SOUND GENERATOR WEARABLE ON THE HEAD, SIGNAL PROCESSOR AND METHOD FOR OPERATING A SOUND GENERATOR OR A SIGNAL PROCESSOR

(71) Applicant: Kaetel Systems GmbH, Munich (DE)

(72) Inventor: Klaus Kaetel, Munich (DE)

(73) Assignee: KAETEL SYSTEMS GMBH, Munich (DE)

( * ) Notice: Subject to any disclaimer, the term of this patent is extended or adjusted under 35 U.S.C. 154(b) by 360 days.

(21) Appl. No.: 18/352,675

(22) Filed: Jul. 14, 2023

(65) Prior Publication Data

US 2023/0362532 A1 Nov. 9, 2023

Related U.S. Application Data

(63) Continuation of application No. PCT/EP2022/051251, filed on Jan. 20, 2022.

(30) Foreign Application Priority Data

Jan. 21, 2021 (DE) ......................... 102021200552.7

(51) Int. Cl.
*H04R 1/10* (2026.01)
*H04R 1/40* (2006.01)
(Continued)

(52) U.S. Cl.
CPC ......... *H04R 1/1075* (2013.01); *H04R 1/1091* (2013.01); *H04R 1/403* (2013.01);
(Continued)

(58) Field of Classification Search
CPC ............. G10K 11/04; G10K 11/17825; G10K 11/17875; G10K 2210/3011;
(Continued)

(56) References Cited

U.S. PATENT DOCUMENTS 3,783,192 A * 1/1974 Takahashi ................. H04S 3/02 381/21
3,796,840 A * 3/1974 Ohta .................... H04R 1/1075 381/310
(Continued)

FOREIGN PATENT DOCUMENTS

CN 2626166 Y 7/2004
CN 104640038 A 5/2015
(Continued)

OTHER PUBLICATIONS

International Search Report dated Sep. 12, 2022, issued in application No. PCT/EP2022/051251.
(Continued)

*Primary Examiner* — Carolyn R Edwards
*Assistant Examiner* — Julie X Dang
(74) *Attorney, Agent, or Firm* — McClure, Qualey & Rodack, LLP

(57) ABSTRACT

Sound generator wearable on the head, comprising: a first sound generator element on a first side; and a second sound generator element on a second side, wherein at least a first sound transducer and a second sound transducer are arranged in the first sound generator element such that sound emission directions of the first sound transducer and the second sound transducer are parallel or deviate by less than 30° from a parallel emission direction, and wherein a third sound transducer and a fourth sound transducer are arranged in the second sound generator element such that sound emission directions of the third sound transducer and the fourth sound transducer are parallel to one another or deviate by less than 30° from a parallel emission direction.

24 Claims, 10 Drawing Sheets

(51) Int. Cl.
*H04R 3/12* (2006.01)
*H04R 5/033* (2006.01)

(52) U.S. Cl.
CPC ............... *H04R 3/12* (2013.01); *H04R 5/033* (2013.01); *H04R 2201/003* (2013.01)

(58) Field of Classification Search
CPC G10K 2210/1081; H04R 1/2811; H04R 1/28; H04R 1/1016; H04R 1/1091; H04R 2460/11; H04R 2460/09; H04R 25/456; H04R 1/2873; H04R 2460/01; H04R 2225/025; H04R 1/2826; H04R 25/453; H04R 25/604; H04R 25/65; H04R 1/288; H04R 5/033; H04R 1/1075; H04R 3/12; H04R 1/403; H04R 5/02; H04R 1/1008; H04R 2205/022; H04R 2201/00; H04S 3/004
See application file for complete search history.

(56) References Cited

U.S. PATENT DOCUMENTS

| | | | | | |
|---|---|---|---|---|---|
| 3,984,636 | A * | 10/1976 | Turner | H04R 5/033 381/19 |
| 6,658,121 | B1 | 12/2003 | Konig | |
| 2003/0103637 | A1* | 6/2003 | Huang | H04R 1/1075 381/74 |
| 2005/0207606 | A1 | 9/2005 | Yang | |
| 2006/0188108 | A1* | 8/2006 | Konig | H04R 1/26 381/384 |
| 2007/0121986 | A1* | 5/2007 | Shim | H04R 1/345 381/372 |
| 2008/0049959 | A1* | 2/2008 | Yang | H04R 1/1075 381/370 |
| 2011/0301729 | A1 | 12/2011 | Heiman et al. | |
| 2012/0008812 | A1* | 1/2012 | Sporer | H04R 1/26 381/335 |
| 2013/0077800 | A1 | 3/2013 | Pan | |
| 2015/0117667 | A1* | 4/2015 | Lawande | B60K 35/80 381/86 |
| 2015/0125003 | A1 | 5/2015 | Wiesbauer et al. | |
| 2016/0241962 | A1 | 8/2016 | Kaetel | |
| 2018/0192226 | A1* | 7/2018 | Woelfl | H04S 7/304 |
| 2021/0127199 | A1* | 4/2021 | Clark | H04R 1/2888 |
| 2021/0227324 | A1 | 7/2021 | Rusconi Clerici Beltrami et al. | |
| 2022/0021972 | A1* | 1/2022 | Brimijoin, II | G06T 19/006 |
| 2023/0362532 | A1* | 11/2023 | Kaetel | H04S 3/004 |
| 2024/0031738 | A1* | 1/2024 | Kaetel | H04R 3/12 |

FOREIGN PATENT DOCUMENTS

| | | | | |
|---|---|---|---|---|
| DE | 19819452 | C1 | 1/2000 | |
| DE | 10 2004 036 355 | A1 | 10/2005 | |
| DE | 10 2005 005 759 | A1 | 8/2006 | |
| DE | 10 2006 059 197 | A1 | 3/2008 | |
| DE | 10 2013 221 754 | A1 | 4/2015 | |
| DE | 10 2017 105 594 | A1 | 9/2018 | |
| EP | 1 071 309 | A2 | 1/2001 | |
| EP | 1640972 | A1 * | 3/2006 | H04R 3/005 |
| EP | 3 061 266 | A0 | 8/2016 | |
| EP | 2 692 144 | B1 | 2/2017 | |
| EP | 2 692 154 | B1 | 9/2017 | |
| EP | 2 692 151 | B1 | 1/2018 | |
| EP | 3 061 262 | B1 | 1/2018 | |
| WO | 2010/105280 | A1 | 9/2010 | |

OTHER PUBLICATIONS

Chinese language office action dated Apr. 27, 2026, issued in application No. CN 202280022953.0 (English language translation, pp. 1-13 of attachment).

* cited by examiner (top view on a head)

SOUND GENERATOR WEARABLE ON THE HEAD, SIGNAL PROCESSOR AND METHOD FOR OPERATING A SOUND GENERATOR OR A SIGNAL PROCESSOR

CROSS-REFERENCE TO RELATED APPLICATIONS

This application is a continuation of copending International Application No. PCT/EP2022/051251, filed Jan. 20, 2022, which is incorporated herein by reference in its entirety, and additionally claims priority from German Application No. 102021200552.7, filed Jan. 21, 2021, which is also incorporated herein by reference in its entirety.

The present invention relates to the field of electroacoustics and in particular to concepts for recording and reproducing acoustic signals.

BACKGROUND OF THE INVENTION

Typically, acoustic scenes are recorded by using a set of microphones. Each microphone outputs a microphone signal. For an audio scene of an orchestra, for example, 25 microphones can be used. Then, a sound engineer performs mixing of the 25 microphone output signals, for example into a standard format, such as a stereo format, a 5.1, 7.1, 7.2 or another corresponding format. In a stereo format, for example, the sound engineer or an automatic mixing process generates two stereo channels. In a 5.1 format, mixing results in five channels and one subwoofer channel. Analogously, in a 7.2 format, for example, a mixture into seven channels and two subwoofer channels is performed. When the audio scene is to be rendered in a reproduction environment, a mixing result is applied to electrodynamic loudspeakers. In a stereo reproduction scenario, two loudspeakers exist, wherein the first loudspeaker receives the first stereo channel and the second loudspeaker receives the second stereo channel. In a 7.2 reproduction format, for example, seven loudspeakers exist at predetermined positions and, above that, two subwoofers that can be placed in a relatively arbitrary manner. The seven channels are applied to the respective loudspeakers and the two subwoofer channels are applied to the respective subwoofers.

Using a single microphone arrangement for detecting audio signals and using a single loudspeaker arrangement for reproducing the audio signals typically neglects the true nature of the loud sources. European patent EP 2692154 B1 describes a set for detecting and reproducing an audio scene where not only the translation is recorded and reproduced but also the rotation and above that the vibration. Thus, a sound scene is not only reproduced by a single detection signal or a single mixed signal but by two detection signals or two mixed signals that are, on the one hand, recorded simultaneously and that are, on the other hand, reproduced simultaneously. This achieves that different emission characteristics from the audio scene can be recorded compared to a standard recording and can be reproduced in a reproduction environment.

For this, as illustrated in the European patent, a set of microphones is placed between the acoustic scene and an (imaginary) auditorium to detect the "conventional" or translation signal that is characterized by high directivity or high Q.

Above that, a second set of microphones is placed above or on the side of the acoustic scene to record a signal with low Q or low directivity, which is to map the rotation of the soundwaves in contrast to the translation.

On the reproduction side, respective loudspeakers are placed at the typical standard positions, each of them having an omnidirectional arrangement to reproduce the rotational signal and a directional arrangement to reproduce the "conventional" translatory sound signal. Further, a subwoofer exists either at each of the standard positions or only a single subwoofer at any location.

European patent EP 2692144 B1 discloses a loudspeaker for reproducing, on the one hand, the translatory audio signal and, on the other hand, the rotatory audio signal. Thus, the loudspeaker has an omnidirectionally emitting arrangement on the one hand and a directionally emitting arrangement on the other hand.

European patent EP 2692151 B1 discloses an electret microphone that can be used for recording the omnidirectional or the directional signal.

European patent EP 3061262 B1 discloses an earphone and a method for producing an earphone generating both a translatory sound field as well as a rotatory sound field.

European patent application EP 3061266 AO intended for grant discloses a headphone and a method for generating a headphone that is configured to generate the "conventional" translatory sound signal by using a first transducer, and to generate the rotatory sound field by using a second transducer arranged perpendicular to the first transducer.

Recording and reproducing the rotatory sound field in addition to the translatory sound field results in a significantly improved and therefore high-quality audio signal perception that almost gives the impression of a live concert although the audio signal is reproduced by loudspeakers or headphones or earphones.

This results in a sound experience that is almost indistinguishable from the original sound scene where the sound is not emitted by loudspeakers, but by musical instruments or human voices. This is obtained by considering that sound is emitted not only in a translatory but also rotatory and possibly vibratory manner and is hence to be recorded and reproduced accordingly.

A disadvantage of the described concept is that the recording of the additional signal, which reproduces the rotation of the sound field, represents a further effort. Further, many pieces of music exist, be they classical pieces or pop pieces, where only the conventional translational sound field has been recorded. The data rate of these pieces is typically also heavily compressed, such as according to the MP3 standard or the MP4 standard, which contributes to additional quality degradation, but which is usually only audible to skilled listeners. On the other hand, almost no audio pieces exist anymore that are not at least recorded in stereo format, i.e. with a left channel and a right channel. The development even tends to go in the direction of creating more channels than a left and a right channel, so that surround recordings with, for example, five channels or even recordings with higher formats are created, which is known in the field by the keyword MPEG Surround or Dolby Digital.

Thus, a great many different pieces exist that are recorded at least in stereo format, that is, with a first channel for the left side and a second channel for the right side. There are even more and more pieces that have been recorded with more than two channels, for example for a format with several channels on the left side and several channels on the right side and one channel in the center. Even higher formats use more than five channels in the plane and, in addition, channels from above or channels from obliquely above and, if possible, channels from below.

A disadvantage of the headphone described in European patent EP 2692144 B1 is that the second transducer is to be arranged perpendicular to the first transducer. This entails a relatively high overall height, so that such a concept results in a rather deeper headphone capsule, which protrudes relatively far from the head when worn, wherein, due to the transducer being arranged at right angles in the headphone capsule, the distance of at least the omnidirectionally emitting transducer from the ear is small.

SUMMARY

According to an embodiment, a sound generator wearable on the head may have: a first sound generator element on a first side; and a second sound generator element on a second side, wherein at least a first sound transducer and a second sound transducer are arranged in the first sound generator element such that sound emission directions of the first sound transducer and the second sound transducer are parallel or deviate by less than 30° from a parallel emission direction, and wherein a third sound transducer and a fourth sound transducer are arranged in the second sound generator element such that sound emission directions of the third sound transducer and the fourth sound transducer are parallel to one another or deviate by less than 30° from a parallel emission direction.

According to another embodiment, a signal processor may have: a first input for a first input channel; a second input for a second input channel, wherein the signal processor is configured to generate, from the first input channel and the second input channel, a first control signal for a first sound transducer and a second control signal for a second sound transducer on a first side of a sound generator, and to generate a third control signal for a third sound transducer and to generate a fourth control signal for a first sound transducer on a second side of the sound generator; and a wireless interface for outputting the first control signal, the second control signal, the third control signal and the fourth control signal.

According to another embodiment, a method for operating a sound generator with a first sound generator element on a first side and a second sound generator element on a second side may have the steps of: emitting sound by a first sound transducer and a second sound transducer in the first sound generator element, such that sound emission directions of the first sound transducer and the second sound transducer are parallel or deviate by less than 30° from a parallel emission direction and emitting sound by a third sound transducer and a fourth sound transducer in the second sound generator element, such that sound emission directions of the third sound transducer and the fourth sound transducer are parallel to one another or deviate by less than 30° from a parallel emission direction.

According to another embodiment, a method for operating a signal processor with a first input for a first input channel and a second input for a second input channel may have the steps of: generating, from the first input channel and the second input channel, a first control signal for a first sound transducer and a second control signal for a second sound transducer on a first side of a sound generator, and a third control signal for a third sound transducer and a fourth control signal for a fourth sound transducer on a second side of the sound generator; and outputting, via a wireless interface, the first control signal, the second control signal, the third control signal and the fourth control signal.

Another embodiment may have a non-transitory digital storage medium having a computer program stored thereon to perform any of the inventive methods when said computer program is run by a computer.

The present invention is based on the finding that a more efficient sound generator concept can be obtained by providing a first sound generator element on a first head side and a second sound generator element on a second head side with two sound transducers each, which are arranged in their sound generator element such that sound emission directions of the respective at least two sound transducers arranged in a sound generator element are parallel to each other or deviate from each other by less than 30°.

This makes it possible for the individual sound transducers in the corresponding headphone capsules to have a relatively small "footprint", so that headphone capsules can be achieved that can have a relatively flat configuration. This concept further enables implementation within an in-ear headphone element, i.e., within a headphone that is not worn as a headphone capsule on the outside of the ear, but can be inserted into the external auditory canal. Since the two loudspeakers or sound transducers in a headphone capsule or in an in-ear element for one ear both emit in the same direction or in only a slightly divergent direction, it is made possible for these two sound transducers to be arranged in the same plane, i.e. typically next to each other. Compared to the previous headphone, this results in a larger width of a headphone capsule, since two transducers are now arranged next to each other. However, compared to the alternative with one transducer in front of the other transducer, this is much simpler in terms of design and is not critical with regard to the higher space consumption, because the dimensions for the individual sound transducers are not critical anyway, compared to dimensions of headphone capsules that enclose the entire ear. For in-ear configurations, implementation is not critical anyway because two miniature transducers, placed next to each other, can each emit into the ear via two openings placed next to each other. This achieves a space-saving design with good audio quality.

Depending on the implementation, i.e. whether the headphone is provided with a signal processor or whether the headphone is already fed with the individual signals for the transducers, and depending on the implementation of the signal generation for the individual headphones, a separating line or separating ridge is provided between the two headphones to separate the two sound transducers arranged on one side in a sound generator element, in order to mechanically decouple the two sound transducers arranged next to each other. This mechanical decoupling can then be dispensed with when electronic decoupling is performed, as achieved, for example, by means of a signal processor, which comprises mutually orthogonal filter banks in the signal paths for the different sound transducers in a sound generator element. The first sound transducer receives a signal that has been filtered by a first plurality of bandpass filters, and the second sound transducer receives a control signal that has been filtered by a second plurality of bandpass filters, wherein the filters for the individual sound transducers are not identical, but are interleaved or "interdigitated" with respect to the center frequencies of the different bandpass filters.

Depending on the implementation with a separating ridge and signal processor without orthogonal bandpass filter arrangements, or an implementation with orthogonal bandpass filter arrangements in the different signal paths and no separating ridge between the transducers in the sound generator element, or an implementation with a separating ridge and orthogonal bandpass filter arrangements in the different signal paths, optimum control of the signals is achieved by the adjacent sound generators, each provided with different signals, which are out of phase in embodiments. In other embodiments, the signals applied to the sound transducers in one and the same sound generator element are out of phase and further have the same bandwidth, except for possibly different filter banks in the signal paths for the sound transducers. Nevertheless, the implementation with different filter banks, which are typically arranged orthogonally or interdigitated or interleaved with each other in the different signal paths, is not a division of a signal into a high-frequency range, a mid-frequency range and a low-frequency range. Instead, the entire spectrum, apart from any missing bands due to the plurality of bandpass filters, is output via each signal transducer.

In embodiments, enhancement of the signals for the individual transducers to emulate rotation is achieved using a side signal generator that calculates a side signal from a left channel and a right channel, wherein the side signal is typically the differential signal between left and right. This embodiment is advantageous if there is no individual rotational signal. However, if there is an individual rotational signal, this signal is fed into the signal paths instead of the side signal.

The side signal or the rotational signal is supplied to both signal paths, so that the side signal or the rotational signal is output by both signal generators in addition to the corresponding left or right channel, respectively. Thus, in the present invention, a sound generator in a sound generator element no longer functions to reproduce the translational signal, as in conventional technology, while the other sound generator functions to reproduce the rotational signal. Instead, both sound generators function to reproduce a combination of both signals, i.e., the rotational component determined from the side signal or supplied directly, and the translational component represented by the input for the corresponding left channel signal and right channel signal, respectively.

In alternative embodiments where no side signal generator is present, the control signal for the sound transducers is generated in a sound generator element by adding, for example, a high-pass filtered left channel with appropriate processing and different phase shifts for both signal paths in addition to the left channel. The combination signal then consists of the left signal present for the left side and an additional high-pass filtered and, if needed, amplified or attenuated original signal provided with different phase shifts depending on the signal path.

In embodiments, the signal processor is included in the sound generator wearable on the head. Then, the sound generator wearable on the head, such as a headphone or earphone, receives only the left and right channels, and the signals for the at least four sound transducers provided according to the invention are then calculated or generated from the received left and right channels transmitted, for example, from a mobile phone via Bluetooth to the sound generator wearable on the head. In this case, an autonomous power supply exists in the sound generator wearable on the head, such as a power supply via a battery or a rechargeable accumulator.

In other embodiments, either the left and right channels or already the four control signals for the different sound transducers are transmitted to the sound generator elements by wired or by wireless communication. In the case of wired transmission, it is advantageous that further a power supply for the sound generator elements is also achieved via wired communication. In the case of wireless transmissions, as illustrated, a power supply, such as a rechargeable accumulator, has to be present in the sound generator wearable on the head. Depending on the implementation, the generation of the control signals for the sound generators is performed directly in the sound generator wearable on the head or separately, for example within a mobile phone, which then transmits the individual control signals for each individual sound generator to the sound generators via wireless communication, for example via Bluetooth or WLAN. Thus, one aspect of the present invention also comprises implementing a signal processor for generating the control signals for the sound transducers in a headphone or earphone, wherein the signal processor is configured separately from the sound transducers, for example as an arrangement within a mobile phone or other mobile device.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
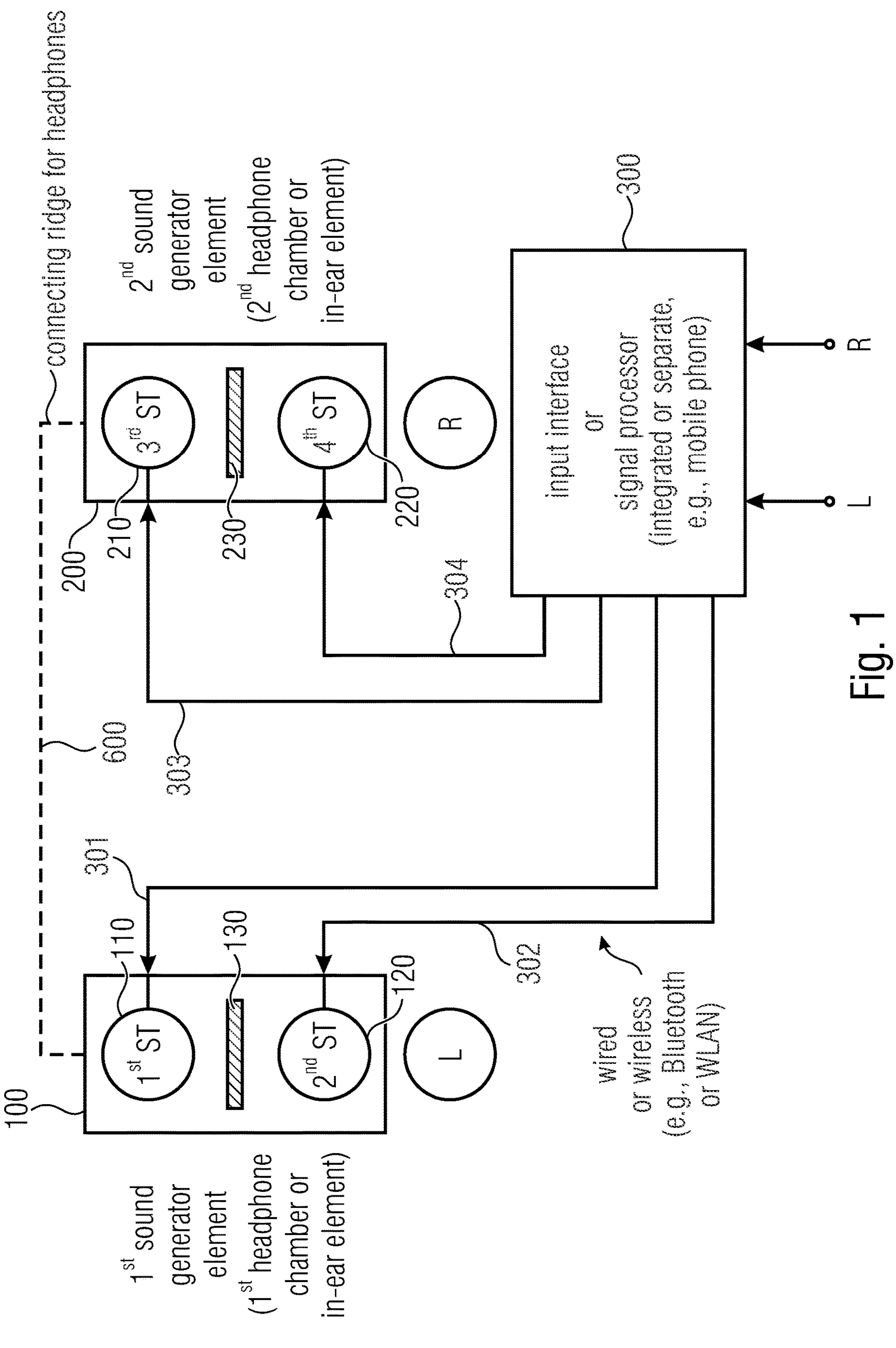
FIG. 1 is a schematic illustration of a sound generator wearable on the head according to embodiments of the present invention.

FIG. 1 shows a sound generator wearable on the head according to an embodiment of the present invention. The sound generator wearable on the head includes a first sound generator element 100 on a first side and a second sound generator element 200 on a second side. For example, the first side may be the left side and the second side may then be the right side. Further, the first sound generator element 100 comprises at least a first sound transducer 110 and a second sound transducer 120 arranged such that sound emission directions of the first sound transducer 110 and the second sound transducer 120 are oriented parallel to each other or deviate from each other by less than 30°. Further, the arrangement in the sound generator element 200 for the other or right side with respect to the third sound transducer 210 and the fourth sound transducer 220 is such that sound emission directions of the third sound transducer 210 and the fourth sound transducer 220 are parallel to each other or deviate from each other by less than 30°.

When the sound generator wearable on the head is a headphone, the two sound generator elements are then connected to each other via a connecting ridge 600. Further, in certain embodiments, separating ridges 130 and 230, respectively, are arranged in the sound generator elements between the individual sound transducers and separate the sound transducers 110 and 120 and 210 and 220, respectively, which are arranged horizontally relative to each other. This means that if the present invention is configured as headphones, the separating ridges 130 or 230 extend vertically, i.e. from bottom to top or from top to bottom, when the headphones are worn on a head, as will be illustrated with reference to FIG. 3. Further, the sound generator wearable on the head is provided with either an input interface or a signal processor, wherein the signal processor is integrated into the headphones or is implemented separately, such as within a mobile phone or other mobile device, as illustrated with respect to element 300. The output of the element 300 thus provides the control signals 301 for the first sound transducer, 302 for the second sound transducer, 303 for the third sound transducer and 304 for the fourth sound transducer, regardless of whether the element 300 is configured as an input interface or is configured as a complete signal processor 300. Thus, the different sound transducers in a sound generator element 100 and 200, respectively, receive different signals from each other, which in an implementation are out of phase and have spectral components in a frequency range between 500 and 15,000 Hz, optionally with different interleaved bands attenuated due to orthogonal bandpass filter structures in the different signal paths. On the other hand, both signals are the same with respect to their power or loudness in a sound generator element. This also represents an advantage of the present invention in that the sound transducers, since they are no longer separated into sound transducers for translational signals and sound transducers for rotational signals, can be configured identically, which simplifies or improves efficient production on the one hand and efficient application on the other, both in terms of wearing comfort and implementation of the signal processor.

In another embodiment, the implementation in FIG. 1 is configured as an earphone, wherein at least one and advantageously all four sound transducers are configured as a balanced armature transducer, as MEMS transducer or as dynamic transducer, each transducer further comprising a separate sound output for directing the sound into the ear according to its sound emission direction, wherein the sound emission direction from each sound transducer is the same or differs by at most 30°.

When implemented as headphones, each sound generator element is formed as a headphone chamber, which can be either a completely closed headphone chamber or an open headphone chamber, which are mechanically connected to each other by the connecting ridge 600 so that the headphones can be worn well and comfortably on an individual's head.

At least one and, however, in particularly advantageous embodiments, each sound transducer in each sound generator element is configured as a headphone capsule, each headphone capsule having the same size, wherein a diameter of a headphone capsule is less than 4 cm.

Figure 2:
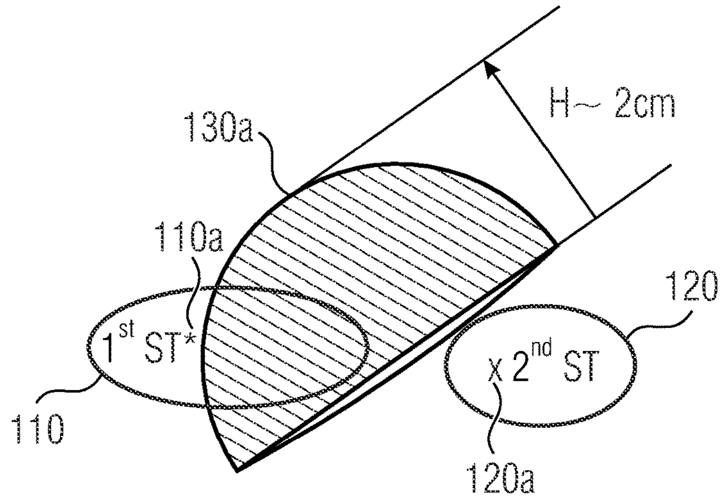
FIG. 2 is a schematic illustration of a partition between the two sound generators in a sound generator element.
Figure 3:
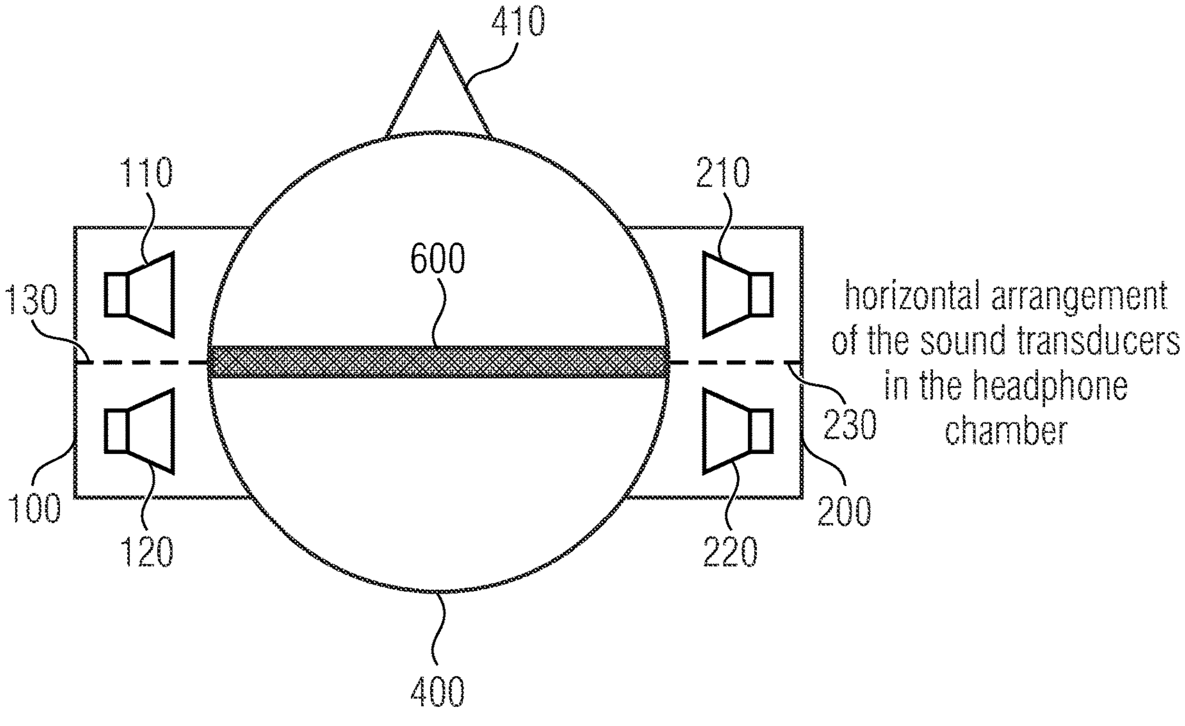
FIG. 3 is a schematic illustration of the arrangement of the sound transducers with respect to the head of a user with horizontal arrangement of the sound transducers to each other.

FIG. 3 shows a schematic illustration of a top view of a head 400 of an individual, of which a nose 410 is schematically drawn in the front of the top view. FIG. 3 further shows the horizontal arrangement of the sound transducers side by side in a sound generator element or headphone capsule 100 and 200, respectively, wherein a partition 130 extending from top to bottom is provided between the two sound transducers, depending on the implementation. This partition is shown in perspective view in FIG. 2 and has a height that protrudes less than 3 cm and advantageously only 2 cm with respect to the first sound transducer 110 and the second sound transducer 210. The partition is not simply a partition, for example rectangular, but semicircular, elliptical or parabolic, wherein the partitioning ridge or partition projects highest at the shortest distance between the two center points or center positions of the first and second sound converters, as can be seen schematically in FIG. 2, wherein the partition has the highest point 130*a* at the direct connection of the two center positions 110*a*, 120*a*.

Although a semicircular separating ridge 130 already provides an improvement over a rectangular separating ridge, it is advantageous to make an elliptical or parabolic separating ridge so that the separating ridge achieves the lowest possible frequency dependence, or rather so that all frequencies emitted by the transducers are affected by the separating ridge as equally as possible.

Figure 4:
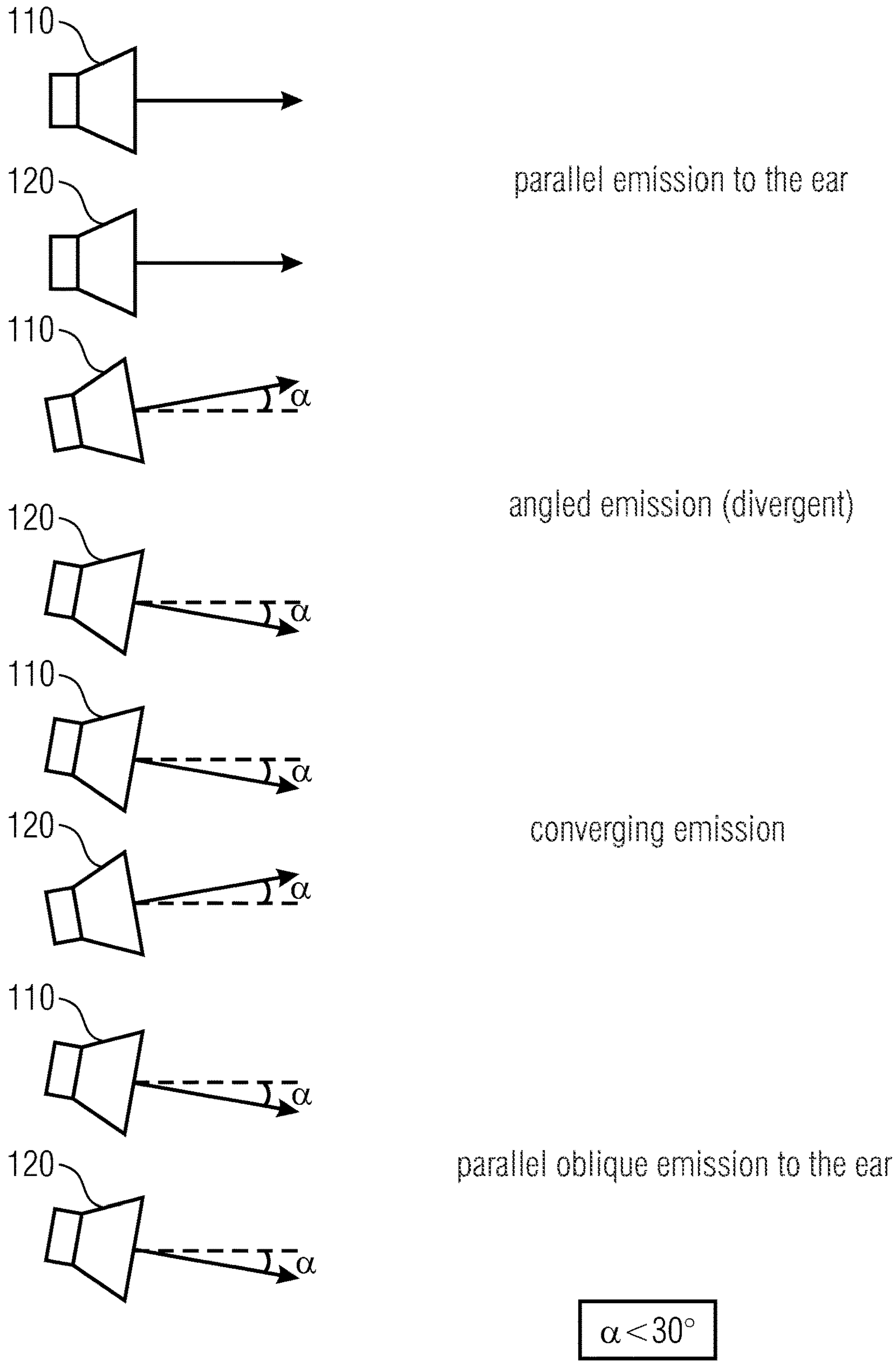
FIG. 4 is a schematic illustration of different arrangements of the individual transducers relative to each other.

FIG. 4 shows arrangements of the two transducers, typically configured as flat headphone capsules, in a headphone chamber. The first partial image shows parallel emission toward the ear. This most advantageous arrangement is favorable in that the two transducers can be placed side by side and both emit toward the ear. The second partial image shows an angled emission with diverging directions. This implementation may be favorable if another arrangement is not possible due to a particular shape of the headphone chamber. More advantageous, however, is the converging emission, where the direction of the transducers can be selected to "aim" the sound into the auditory canal. In the lowest partial image, a parallel or oblique emission towards the ear is shown, which can also be favorable due to external conditions. In all implementations, it has been found that the high-quality sound according to the invention is achieved when the emission directions diverge by less than 30°, to the effect that each sound generator emission deviates by at most 30° to a parallel emission as shown in FIG. 4. Most advantageous is the case where both sound transducers are configured and arranged in one sound generator element, such that there is at most an angle of 30° between the two main emission directions of the two sound transducers or both transducers emit in parallel.

Figure 5:
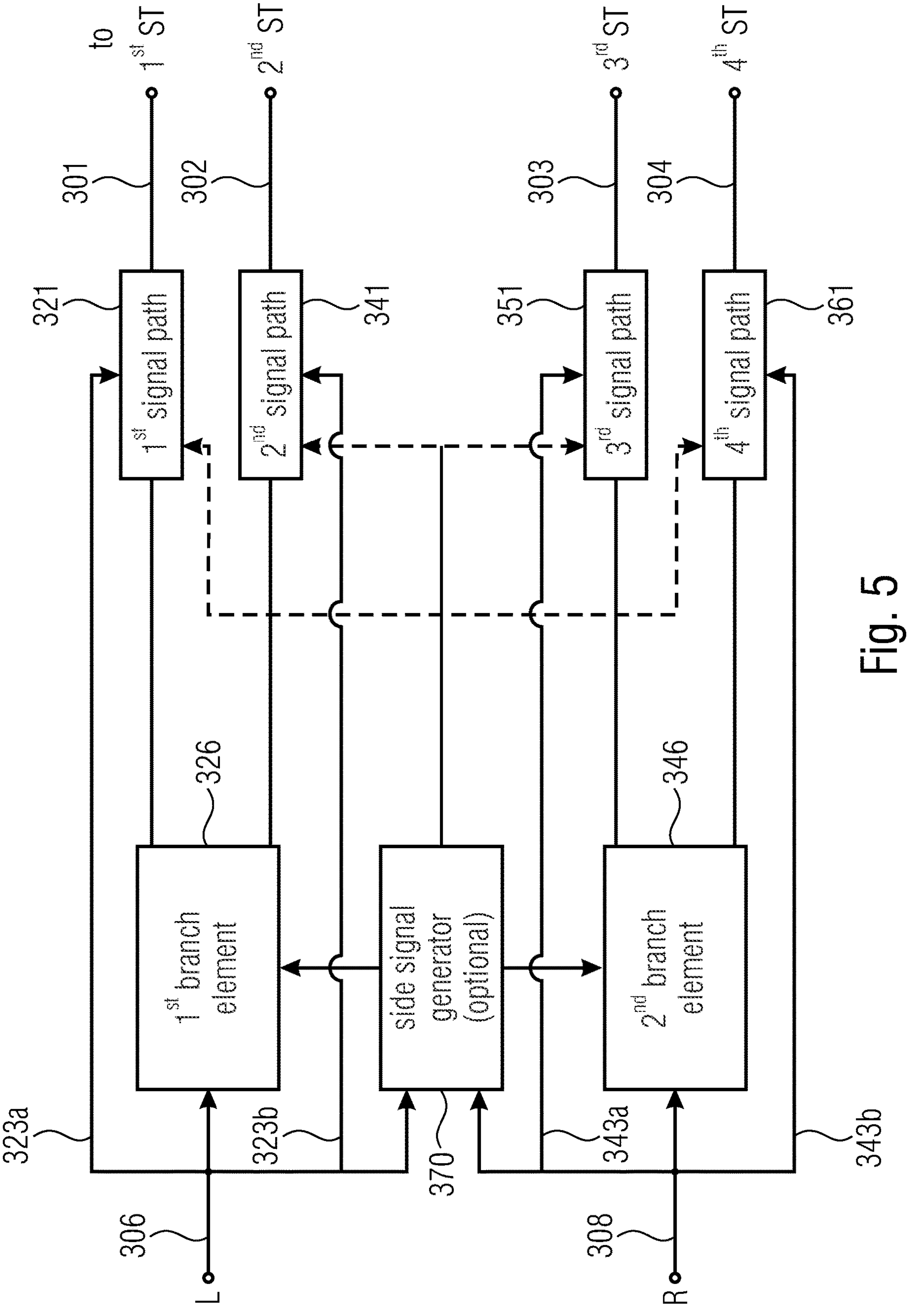
FIG. 5 is a schematic implementation of a signal processor for generating the control signals for the four transducers.

FIG. 5 shows an implementation of the signal processor 300 shown schematically in FIG. 1. On the input side, the signal processor includes a left headphone signal 306 and a right headphone signal 308 via the respective inputs L and R. Further, in an embodiment of the present invention, a separate branch element is provided for each side, i.e., a first branch element 326 (for the left branch) and a second branch element 346 (for the right branch). Each branch element branches the single signal path on the input side, i.e., the left signal, for example, into a first signal path 321 on the output side that provides the control signal for the first transducer and into an output side second signal path that provides the control signal 302 for the second transducer. Further, the signal processor 300 is configured to again include a branch element 346 for generating the control signals 303 and 304 for the third sound transducer 210 of FIG. 1 and the fourth sound transducer 220 of FIG. 1, respectively, the branch element 346 leading into a third signal path 351 and a fourth signal path 361 on the output side.

Further, in embodiments of the present invention, the signal processor includes a side signal generator 370 that receives both the input signal of the first channel 306 and the input signal of the second channel 308 and provides a side signal on the output side and feeds the same into the respective branch element 326 and 346, respectively, or alternatively or additionally feeds the same into the respective signal paths. The side signal for the left channel may be shifted by 180° with respect to the side signal for the right channel. Further, each signal path is configured to receive, in addition to the output signal of the branch element, also the original input signal via bypass lines 323*a*, 323*b* for the left channel or bypass lines 343*a* and 343*b* for the right channel. Thus, each signal transducer receives a control signal consisting of the original left and right channels, respectively, and additionally comprises a signal originating from the branch element. Further, depending on the implementation, the signal in the signal path, i.e. the "combined" signal can be further processed differently for the two signal paths, such as by means of different mutually orthogonal filter banks, i.e. such that the signal for one sound transducer in a headphone chamber and the signal for the other sound transducer in the headphone chamber have different frequency ranges from each other, which, however, together result in an excellent sound due to the previous signal processing.

Figure 6:
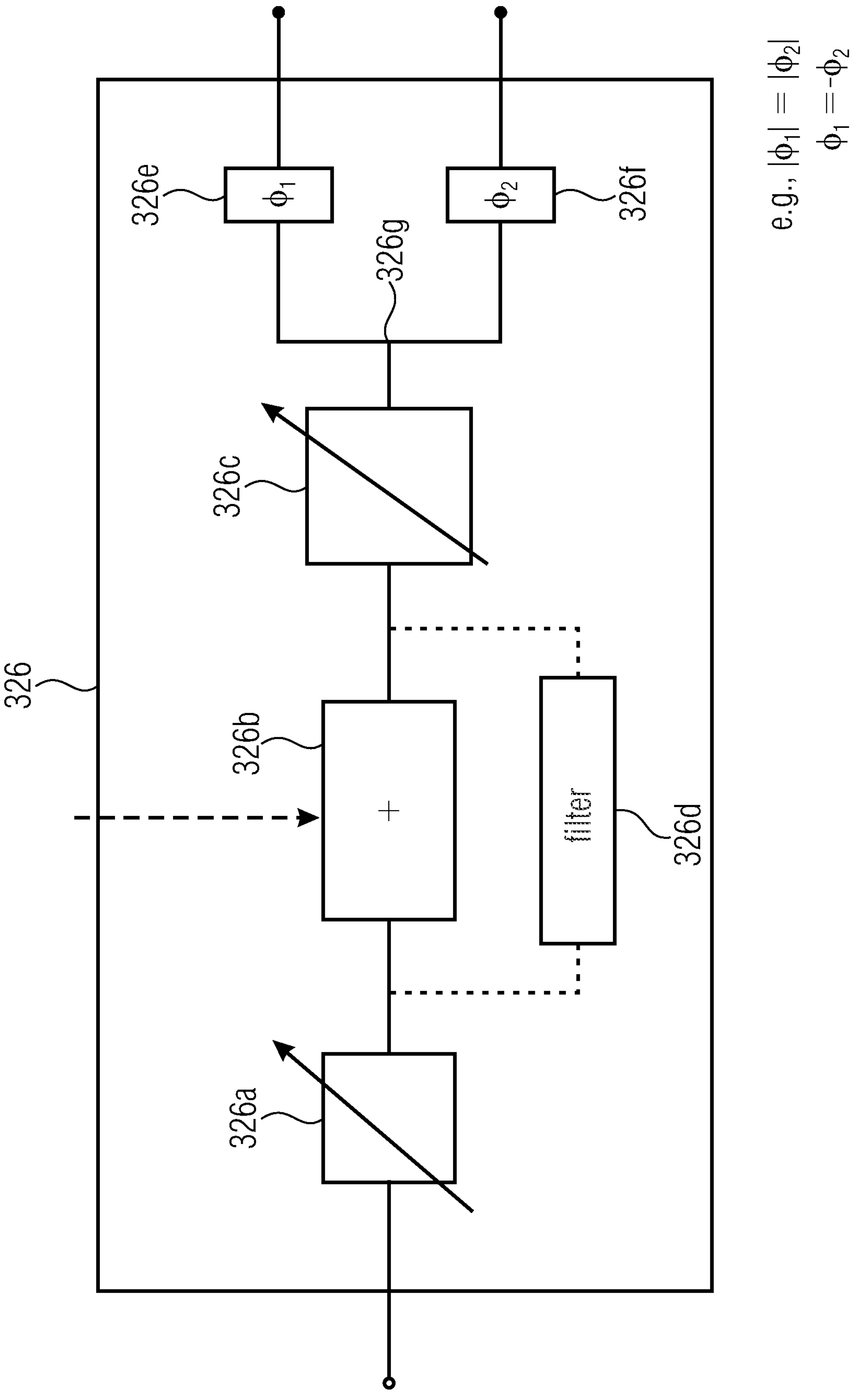
FIG. 6 is an implementation with different options for a branch element of FIG. 5.

FIG. 6 shows an implementation of the branch element 326 or the branch element 346 of FIG. 5. Each branch element can comprise a variable amplifier 326*a* on the input side. Further, an adder 326*b* is provided, via which a side signal can be added, or alternatively another decorrelated signal or, if present, the rotational signal individually recorded and processed, in which case the translation signals are fed in via the left input and the right input.

Figure 8A:
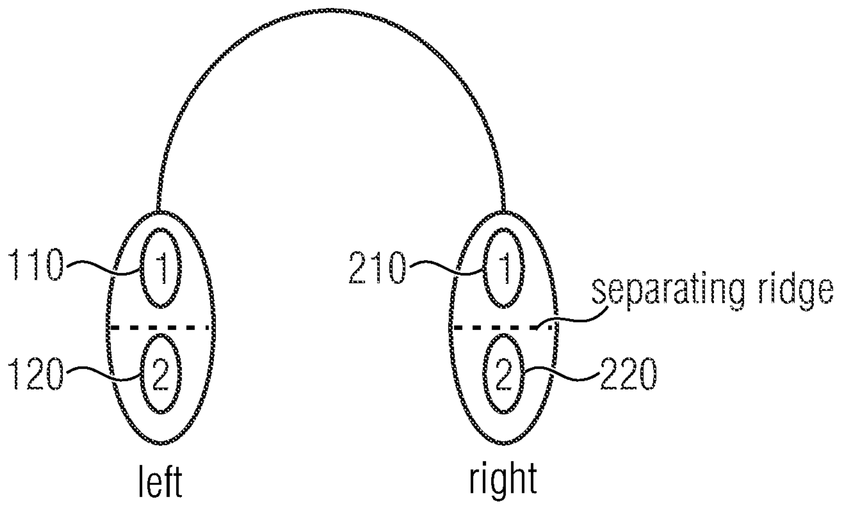
FIG. 8*a* is a schematic illustration of a headphone according to an embodiment of the present invention.
Figure 8B:
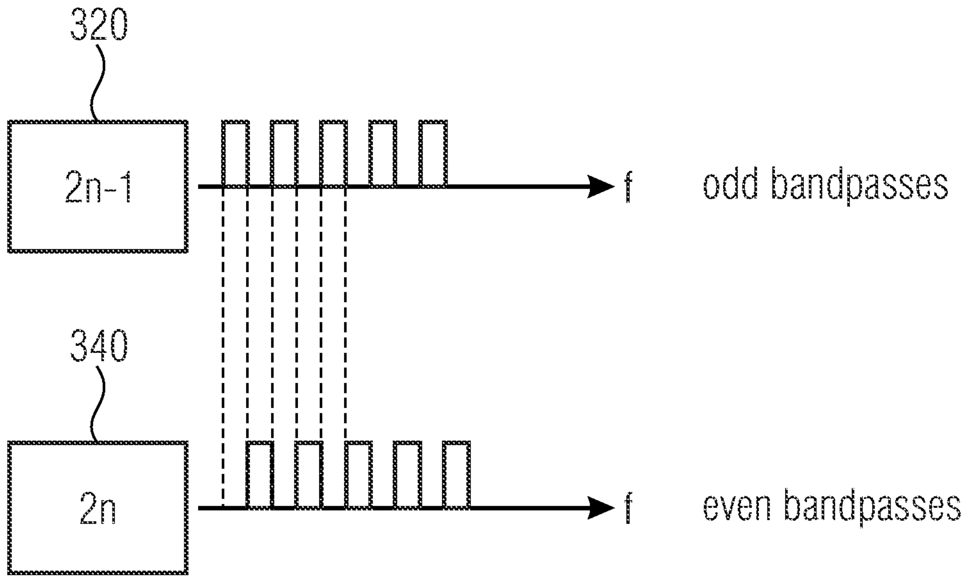
FIG. 8*b* is a schematic illustration of the first and second pluralities of bandpasses in the different signal paths.
Figure 8C:
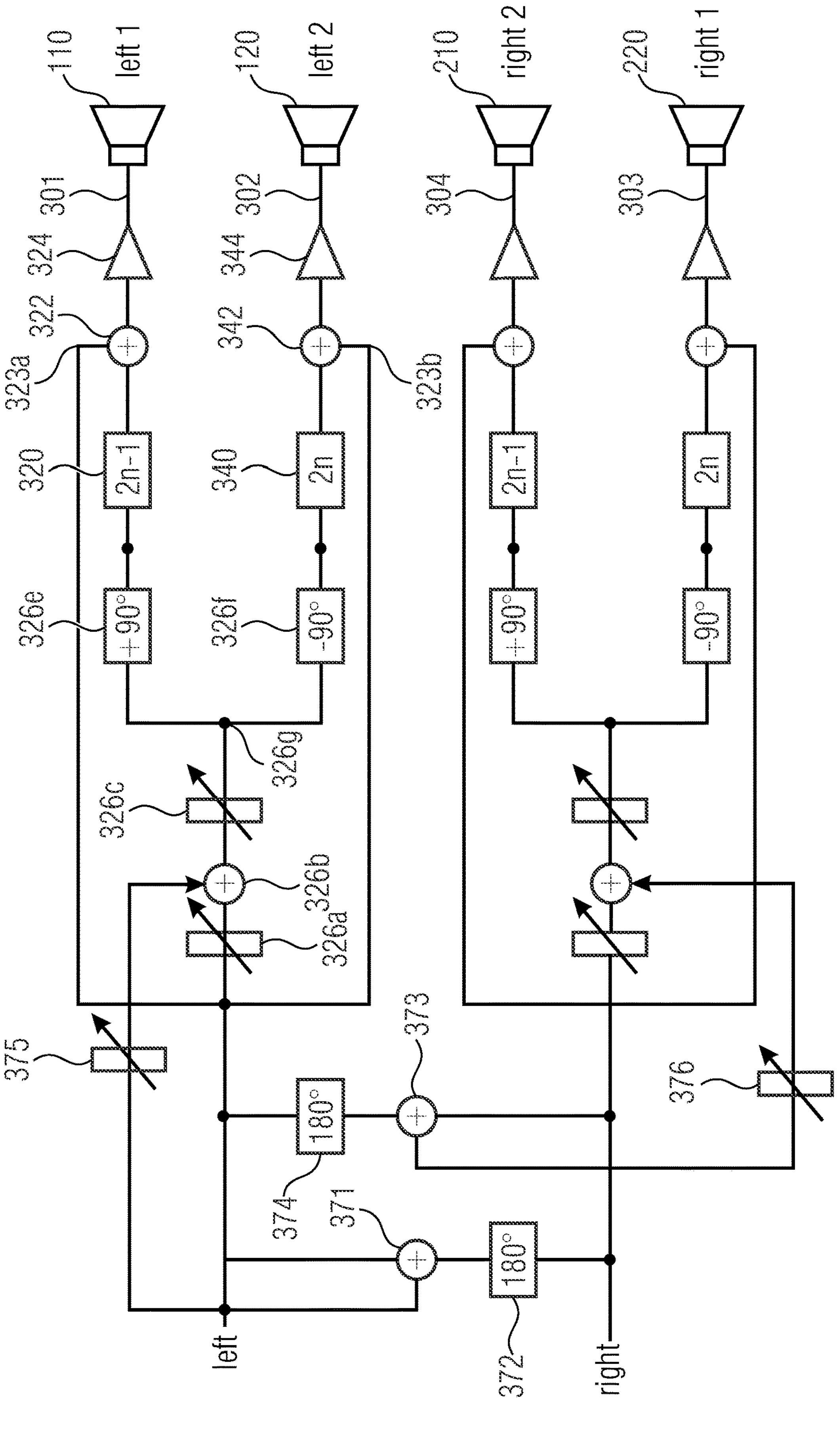
FIG. 8*c* is a schematic arrangement of the integrated implementation of the signal generation in a headphone with side-signal generator and orthogonal bandpasses in the different signal paths.
Figure 9:
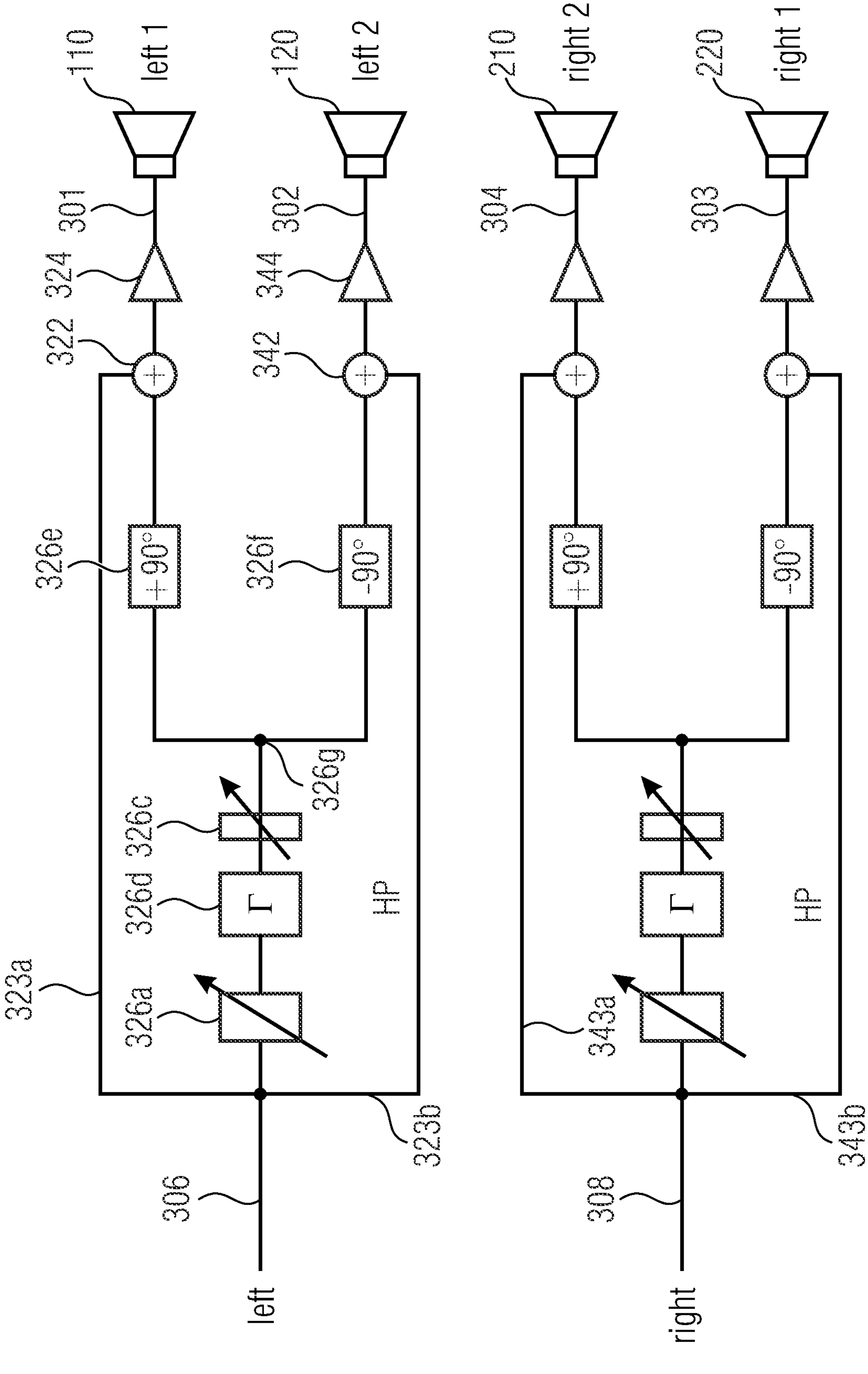
FIG. 9 is an alternative implementation of the present invention without side signal generators and without orthogonal arrangement of bandpasses in the signal paths.

In an alternative embodiment, the adder 326*b* is not present, but is replaced by a filter 326*d*. The alternative with filter is shown in FIG. 9, while the alternative with side signal is shown in FIG. 8*c*. On the output side, depending on the implementation, a variable amplifier 326*c* can again be provided, which, like the variable amplifier 326*a*, can also achieve negative gain, i.e. attenuation. Then, in the branch element, a branch point 326*g* follows, from which the two output signal paths branch off, but with a phase shifter 326*e*, 326*f* connected before each signal path. In embodiments, the branch element includes a separate phase shifter for each signal path, wherein the phase shifters for the two signal paths have the same magnitude, such as between 80 and 100° and advantageously 90°, but have different signs. Alternatively, however, there may be a phase shifter in only one path, such as in the upper or lower path, so that it is still achieved that the signals in the two paths are different from each other or out of phase. However, a symmetrical design as shown in FIG. 6 is advantageous. Further, it should be noted that the variable amplifiers 326*a*, 326*b* do not necessarily have to be present. Instead, only a single amplifier or no amplifier may be provided, or the amplifiers may even be present on the output side after or before the phase shifter, i.e., after the branch element 326*g*, in order to obtain the same effect, but by means of twice the effort, compared to the implementation of the variable amplifier 326*c* before the branch point 326*g*.

Figure 7A:
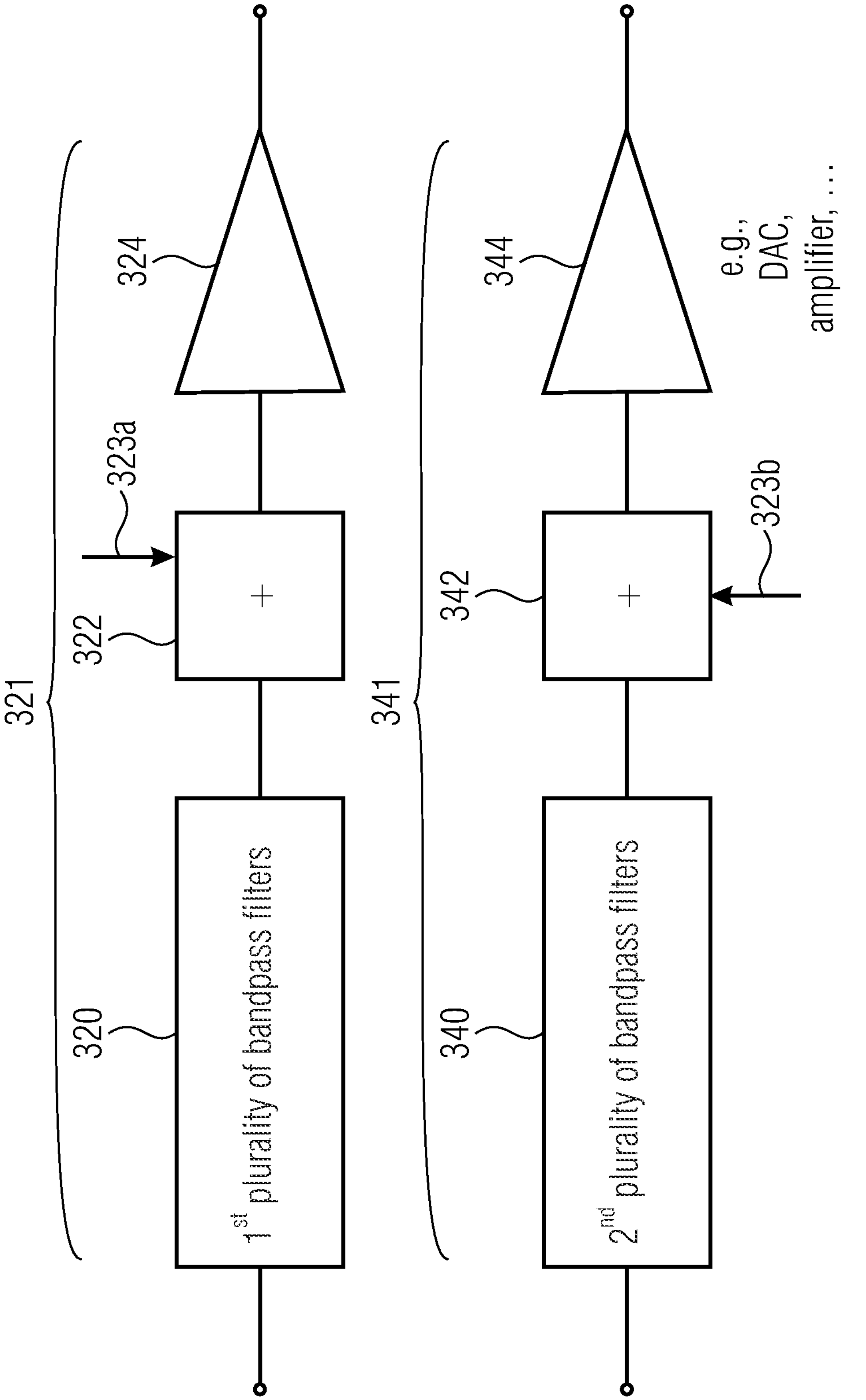
FIG. 7*a* is an implementation of a signal path of FIG. 5.

FIG. 7*a* shows an implementation of the first signal path 321 and, by comparison, the second signal path 341, wherein the first signal path 321 includes a first plurality of bandpass filters 320, and a downstream adder 322 for adding the unmodified original left signal as symbolized by line 323*a*. Accordingly, the second signal path 341 also includes a second plurality of bandpass filters 340, a downstream adder 342, and, like the first signal path 321, an output-side element 324 and 344, respectively, shown as an amplifier in FIG. 7*a*, but which may also include a digital-to-analog converter and other signal conditioning elements. However, if all processing is performed in the analog domain, no digital-to-analog converter is needed.

Figure 7B:
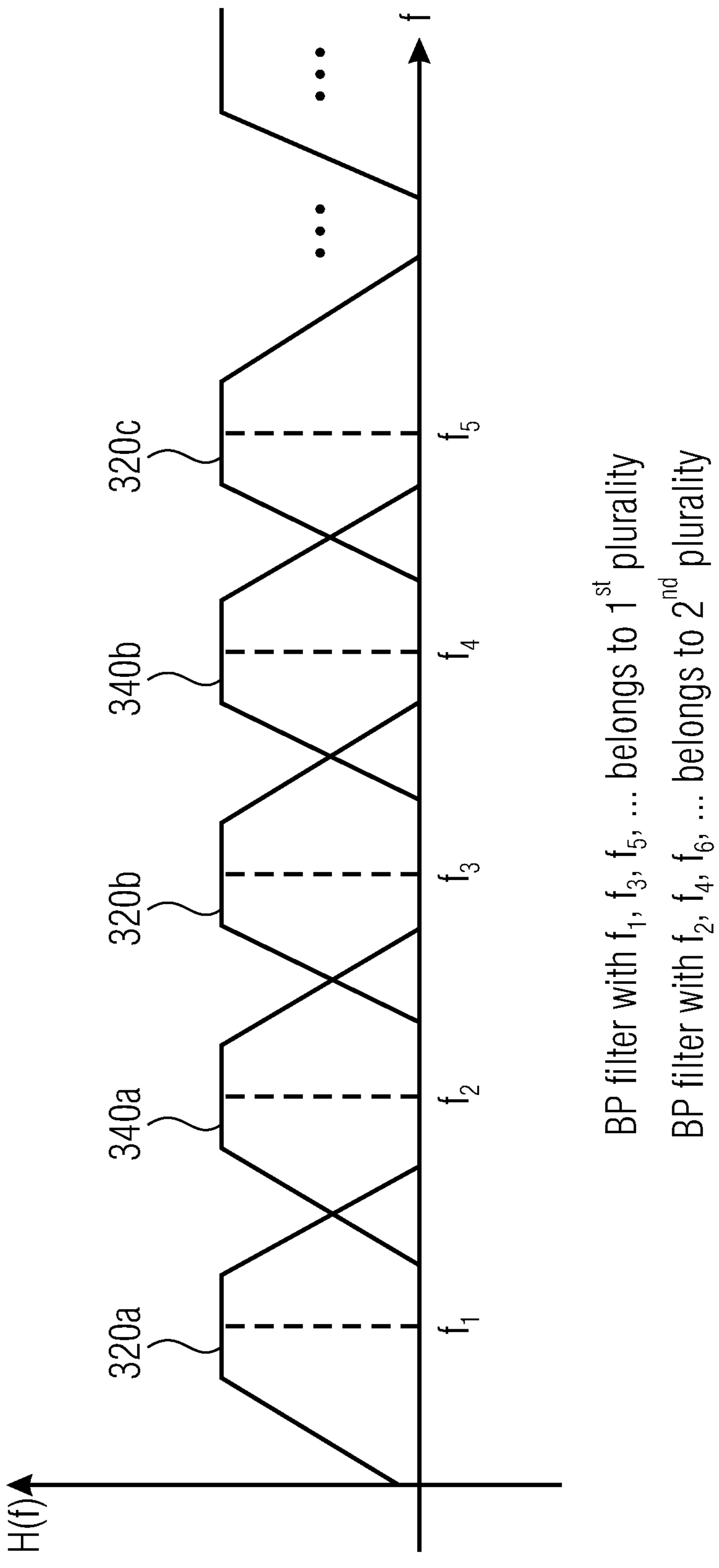
FIG. 7*b* is a schematic illustration of the frequency responses of the first plurality of bandpass filters and the second plurality of bandpass filters of FIG. 7*a;*

The two bandpass filter implementations 320, 340 differ from each other as schematically shown in FIG. 7*b*. The bandpass filter with center frequency $f_1$, which at 320*a* is shown in FIG. 7*b* with respect to its transfer function H(f), as well as the bandpass filter 320*b* with center frequency $f_3$, which is shown as 320*b*, as well as the bandpass filter 320*c* with center frequency $f_5$, belong to the first plurality of bandpass filters 320 and are therefore arranged in the first signal path 321, while the bandpass filters 340*a*, 340*b* with center frequencies $f_2$ and $f_4$ are arranged in the lower signal path 341, i.e. belong to the second plurality of bandpass filters. The bandpass filter implementations 320, 340 are thus orthogonal to each other and interdigitated or interleaved, respectively, so that the two signal transducers in a sound generator element, for example the sound generator element 100 of FIG. 1 emit signals with the same total bandwidth, but differ in that every second band in each signal is attenuated. This makes it possible to dispense with the separating ridge, since the mechanical separation has been replaced by an "electrical" separation. The bandwidths of the individual bandpass filters in FIG. 7*b* are only drawn schematically. The bandwidths increase from bottom to top, in the form of an approximated Bark scale. Further, it is advantageous that the entire frequency range is divided into at least 20 bands, so that the first plurality of bandpass filters comprises 10 bands and the second plurality of bandpass filters also comprises 10 bands, which then in turn reproduce the entire audio signal by superposition due to the emission of the sound transducers.

Other divisions or implementations of the bandpass filters in a digital way, for example by means of a filter bank, a critically sampled filter bank, a QMF filter bank or a Fourier transform of whatever kind or an MDCT implementation with subsequent combining or different processing of the bands can also be used. Likewise, the different bands may also have a constant bandwidth from the bottom end to the upper end of the frequency range, for example from 500 to 15000 Hertz/Hz or above. Further, the number of bands may also be substantially greater than 20, such as 40 or 60 bands, such that each plurality of bandpass filters reproduces half of the total number of bands, such as 30 bands in the case of 60 bands overall.

An illustration of the implementation of FIG. 7*a* together with a side signal generator is shown in FIG. 8*c*. FIG. 8*b* shows a schematic illustration in that 2n even-numbered bandpasses are used in the generation for the control signal 302, 303, while 2n−1 (odd-numbered bandpasses) are used for the generation of the control signal 301 and 304. Further, the arrangement of the transducers in a headphone is shown schematically in FIG. 8*a*, where the separating ridge is shown dashed, since it can then be omitted if electronic decoupling is achieved by the mutually orthogonal bandpasses. However, in addition to electrical decoupling, mechanical decoupling can of course also be achieved with the separating ridge.

FIG. 8*c* further shows an implementation of the branch element of FIG. 6 with adder 326*b* and phase shifts of +/−90° in the phase shifter elements 326*e*, 326*f*. Further, the side signal generator 370 is configured to calculate the side signal as (L−R) for the left area, i.e. the two signal paths 321, 341, which is shown by the 180° phase shifter 372 and the adder 371 in FIG. 8*c*. Further, for the two signal paths 351, 361, another side signal is generated for the right signal processing block, namely the signal (R−L), which is again achieved by the two blocks 374 (180° phase shift) and 373 (adder). Further, FIG. 8*c* shows that the corresponding side signal can be variably amplified/attenuated, as represented by the variable gain elements 375, 376. Depending on the implementation, the corresponding side signal is added into the branch element via the adder 326*b*, which is arranged before the branch point 326*g*. Alternatively, however, two adders 326*b* can be provided after the branch point 326*g* in the upper branch and in the lower branch. Further, FIG. 8*c* also shows the additional coupling of the unmodified left channel via adders 322, 342 in the left signal processing block and the corresponding adders in the right signal processing block at the bottom of FIG. 8*c*.

FIG. 9 shows an alternative implementation of the present invention without side signal generator 370 and with an embodiment of the branch element 326 with the filter 326*d* of FIG. 6. This filter is a high pass (HP) filter. In the implementation shown in FIG. 9, the coupling of the original left and right signals, respectively, into the two signal paths using blocks 323*a*, 323*b* is further included.

Since electrical decoupling by means of orthogonal bandpass filters does not occur in FIG. 9, it is advantageous to use the separating ridge in the embodiment shown in FIG. 9. On the other hand, the separating ridge can also be omitted in the embodiment shown in FIG. 8*c*, since electrical decoupling is used by means of the mutually orthogonal bandpass filters.

In a further embodiment, in FIG. 9, electronic decoupling can further be achieved by the filter banks 320, 340, as in FIG. 8*c* or FIG. 7*a*, without using side signal generation. In this case, too, the separating ridge can be dispensed with because of the existing electronic decoupling of the two transducers arranged next to each other. However, both measures can also be taken, namely both the separating ridge and the electronic decoupling.

Specific setting states of the embodiment of FIG. 8*c* are discussed below. Depending on the setting of amplifier 326*a* and amplifier 375, respectively 376, the portion of the side signal filtered by the orthogonal filter banks can be made large or small. If the amplifier 326*a* is set to heavy attenuation and the amplifier 375 is set to amplification, the output of the adder 326*b* is mainly the side signal, which is processed by the phase shifters 326*b*, 326*f* and the filter banks 320, 340 and is then impressed on the original left signal by the adders 322, 342, for example. Then, the two signals output by the two sound transducers 110, 120 arranged next to each other differ quite strongly. Although they have the common part delivered through the branches 323*a*, 323*b*, they differ in the side signal, which is amplified compared to the left channel, for example. On the other hand, if the amplifier 326*a* is set to relatively high gain and the amplifier 375 is set to relatively low gain, the portion of the orthogonally filtered side signal in the control signal 301, 302 will be relatively small, so that almost the same signal is output by the two sound transducers 110, 120. Depending on the type of application and respective situation and respective headphones or earphones, an optimum setting can thus be found by the respective elements due to the high flexibility of the present invention, which setting can be found, for example, empirically by hearing tests for specific sound material and can be programmed in or reprogrammed automatically or manually depending on the type of application.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Sound generator wearable on a head, comprising:

a first sound generator element on a first side; and a second sound generator element on a second side, wherein at least a first sound transducer and a second sound transducer are arranged in the first sound generator element such that sound emission directions of the first sound transducer and the second sound transducer are parallel or deviate by less than 30° from a parallel emission direction, and wherein a third sound transducer and a fourth sound transducer are arranged in the second sound generator element such that sound emission directions of the third sound transducer and the fourth sound transducer are parallel to one another or deviate by less than 30° from a parallel emission direction, a signal processor to generate, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the signal processor comprises: a first input for the first input channel; a second input for the second input channel; a first branch element connecting the first input to a first signal path for the first sound transducer and to a second signal path for the second sound transducer; or a second branch element connecting the second input to a third signal path for the third sound transducer and to a fourth signal path for the fourth sound transducer, wherein at least one signal path of the first signal path and the second signal path or at least one signal path of the third signal path and the fourth signal path comprises a phase shifter, and wherein the first signal path comprises a first plurality of bandpass filters and the second signal path comprises a second plurality of bandpass filters, wherein the first plurality of bandpass filters or the second plurality of bandpass filters are configured orthogonal to one another, such that a bandpass channel of the first plurality of bandpass filters comprises a frequency pass band that corresponds to a frequency stop band in the second plurality of bandpass filters.

2. The sound generator according to claim 1 configured as earphones, wherein at least one sound transducer of the first to fourth sound transducers is configured as balanced armature transducer, as MEMS transducer or dynamic transducer, and wherein each transducer comprises its own sound output to emit sound in the emission direction.

3. The sound generator according to claim 1 configured as headphones, wherein the first sound generator element comprises a first headphone chamber, wherein the second sound generator element comprises a second headphone chamber, and wherein a connecting ridge connecting the first headphone chamber and the second headphone chamber to one another is arranged, and wherein the first sound transducer and the second sound transducer are arranged in the first headphone chamber, and wherein the third sound transducer and the fourth sound transducer are arranged in the second headphone chamber.

4. Sound generator according to claim 1, wherein the first sound transducer and the second sound transducer are arranged horizontally next to each other when the sound generator is worn on the head, or wherein the third sound transducer and the fourth sound transducer are arranged horizontally next to each other when the sound generator is worn on the head.

5. The sound generator according to claim 1, wherein a first partition is arranged between the first sound transducer and the second sound transducer, which projects less than 3 cm with respect to the first sound transducer and the second sound transducer or wherein a second partition is arranged between the third sound transducer and the fourth sound transducer, which projects less than 3 cm with respect to the third sound transducer and the fourth sound transducer or wherein the first partition or the second partition project by at least 1 cm with respect to a respective pair of first and second sound transducers or third and fourth sound transducers.

6. The sound generator according to claim 5, wherein the first partition or the second partition is semicircular, elliptical or parabolic, wherein the partition projects highest at a shortest distance between center portions of the first and second sound transducer or the third and fourth transducer.

7. The sound generator according to claim 1, wherein the first branch element or the second branch element, or the first signal path, or at least one signal path of the first signal path, the second signal path, the third signal path and the fourth signal path comprises a frequency-selective filter to acquire a filtered portion of the first input channel or the second input channel in the respective signal path, and wherein the respective signal path further comprises an adder to add an unfiltered portion of the first input channel or the second input channel to the filtered portion.

8. The sound generator according to claim 7, wherein the frequency-selective filter comprises a highpass filter.

9. The sound generator according to claim 1, wherein the first plurality of bandpass filters comprises at least two bandpass filters with a first center frequency and a third center frequency, wherein the second plurality of bandpass filters comprises at least two bandpass filters comprising a second center frequency and a fourth center frequency, wherein the first center frequency, the second center frequency, the third center frequency and the fourth center frequency are arranged in increasing frequency order, and wherein the first plurality of bandpass filters each comprise a stop band at the second center frequency and the fourth center frequency, and wherein the second plurality of bandpass filters each comprise a stopband at the first center frequency and the third center frequency.

10. Sound generator wearable on a head, comprising:

a first sound generator element on a first side; and a second sound generator element on a second side, wherein at least a first sound transducer and a second sound transducer are arranged in the first sound generator element such that sound emission directions of the first sound transducer and the second sound transducer are parallel or deviate by less than 30° from a parallel emission direction, and wherein a third sound transducer and a fourth sound transducer are arranged in the second sound generator element such that sound emission directions of the third sound transducer and the fourth sound transducer are parallel to one another or deviate by less than 30° from a parallel emission direction, a signal processor to generate, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the signal processor comprises a side signal generator that is configured to generate one or several side signals from the first input channel and the second input channel, and wherein the signal processor is configured to determine the first control signal, the second control signal, the third control signal and the fourth control signal by using the one or several side signals, or wherein the signal processor comprises: a further side signal generator or a side signal modifier to generate at least one further side signal; and a further side signal combiner to combine the further side signal with another left channel and a right channel before branching into two respective signal paths or after branching into the respective signal paths, or wherein the signal processor comprises: a side signal generator for generating a first side signal and a second side signal from the first input channel and the second input channel; a first side signal combiner for combining the first side signal with the first input channel; a second side signal combiner for combining the second side signal with the second input channel; a first branch element for branching an output signal of the first side signal combiner into a first signal path for the first control signal and into a second signal path for the second control signal; and a second branch element for branching an output signal of the second side signal combiner into a third signal path for the third control signal and into a fourth signal path for the fourth control signal.

11. The sound generator according to claim 10, wherein the signal processor comprises:

a side signal combiner for combining the side signal with the left channel or the right channel in terms of signal flow before branching into the first signal path and the second signal path, or the third signal path and the fourth signal path, or in terms of signal flow after branching into the respective two signal paths.

12. The sound generator according to claim 10, wherein the first side signal combiner is arranged in the first branch element and the second side signal combiner is arranged in the second branch element, wherein the first branch element or the second branch element comprises a controllable amplifier at a combiner input or a controllable amplifier at a combiner output or wherein the side signal generator comprises a controllable amplifier element for increasing or decreasing an amplitude of the first side signal or the second side signal or wherein the side signal generator is configured to generate the first side signal and the second side signal such that a phase shift between the first side signal and the second side signal comprises a value between 120° and 240° and advantageously 180°.

13. The sound generator according to claim 10, wherein the first branch element or the second branch element is configured to provide a signal for the first signal path with a positive phase shift by using a phase shifter and to provide a signal for the second signal path with a negative phase shift by using a further phase shifter.

14. The sound generator according to claim 13, wherein the first or second branch element is configured to generate a positive phase shift between 70° and 100° and to generate a negative phase shift between −70° and −100°.

15. The sound generator according to claim 10, wherein the first signal path comprises a first plurality of bandpass filters and the second signal path comprises a second plurality of bandpass filters, wherein the first plurality of bandpass filters and the second plurality of bandpass filters are formed orthogonally to one another, such that a bandpass channel of the first plurality of bandpass filters comprises a frequency pass band that corresponds to a frequency stop band in the second plurality of bandpass filters.

16. The sound generator according to claim 15, wherein the first signal path comprises the first plurality of bandpass filters, wherein the second signal path comprises the second plurality of bandpass filters, wherein the third signal path comprises the first plurality of bandpass filters and wherein the fourth signal path comprises the second plurality of bandpass filters, wherein the first signal path is configured to provide the first control signal for the first sound transducer, wherein the second signal path is configured to provide the second control signal for the second signal path, wherein the third signal path is configured to provide the third control signal for the third sound transducer and wherein the fourth signal path is configured to provide the fourth control signal for the second sound transducer, wherein the first sound transducer is arranged horizontally next to the second sound transducer and wherein the fourth sound transducer is arranged horizontally next to the third sound transducer, or wherein the first plurality of bandpass filters comprise even bandpass filters and a second plurality of bandpass filters comprise odd bandpass filters.

17. Signal processor, comprising:

a first input for a first input channel;

a second input for a second input channel, wherein the signal processor is configured to generate, from the first input channel and the second input channel, a first control signal for a first sound transducer and a second control signal for a second sound transducer on a first side of a sound generator, and to generate a third control signal for a third sound transducer and to generate a fourth control signal for a first sound transducer on a second side of the sound generator; and a wired or wireless interface for outputting the first control signal, the second control signal, the third control signal and the fourth control signal, wherein the signal processor comprises: a side signal generator for generating a first side signal and a second side signal from the first input channel and the second input channel; a first side signal combiner for combining the first side signal with the first input channel; a second side signal combiner for combining the second side signal with the second input channel; a first branch element for branching an output signal of the first side signal combiner into a first signal path for the first control signal and into a second signal path for the second control signal; and a second branch element for branching an output signal of the second side signal combiner into a third signal path for the third control signal and into a fourth signal path for the fourth control signal, or wherein a first signal path for the first control signal comprises a first plurality of bandpass filters and a second signal path for the second control signal comprises a second plurality of bandpass filters, wherein the first plurality of bandpass filters and the second plurality of bandpass filters are formed orthogonally to one another, such that a bandpass channel of the first plurality of bandpass filters comprises a frequency pass band that corresponds to a frequency stop band in the second plurality of bandpass filters, or wherein a first signal path for the first control signal comprises a first plurality of bandpass filters, wherein a second signal path for the second control signal comprises a second plurality of bandpass filters, wherein a third signal path for the third control signal comprises the first plurality of bandpass filters, and wherein a fourth signal path for the fourth control signal comprises the second plurality of bandpass filters, wherein the first sound transducer is arranged horizontally next to the second sound transducer and wherein the fourth sound transducer is arranged horizontally next to the third sound transducer, or wherein the first plurality of bandpass filters comprise even bandpass filters and a second plurality of bandpass filters comprise odd bandpass filters.

18. The signal processor according to claim 17, wherein the first side signal combiner is arranged in the first branch element and the second side signal combiner is arranged in the second branch element, wherein the first branch element or the second branch element comprises a controllable amplifier at a combiner input or a controllable amplifier at a combiner output or wherein the side signal generator comprises a controllable amplifier element for increasing or decreasing an amplitude of the first side signal or the second side signal or wherein the side signal generator is configured to generate the first side signal and the second side signal such that a phase shift between the first side signal and the second side signal comprises a value between 120° and 240° and advantageously 180°.

19. The signal processor according to claim 17, wherein the first branch element or the second branch element is configured to provide a signal for the first signal path with a positive phase shift by using a phase shifter and to provide a signal for the second signal path with a negative phase shift by using a further phase shifter.

20. The signal processor according to claim 17 arranged in a mobile device, wherein the first input and the second input of the signal processor can be coupled to an audio library stored in the mobile device, or wherein the first input and the second input can be coupled to a remote audio library via an interface of the mobile device, and wherein the wireless interface is a Bluetooth interface or a WLAN interface.

21. Method for operating a sound generator with a first sound generator element on a first side and a second sound generator element on a second side, comprising:

emitting sound by a first sound transducer and a second sound transducer in the first sound generator element, such that sound emission directions of the first sound transducer and the second sound transducer are parallel or deviate by less than 30° from a parallel emission direction;

emitting sound by a third sound transducer and a fourth sound transducer in the second sound generator element, such that sound emission directions of the third sound transducer and the fourth sound transducer are parallel to one another or deviate by less than 30° from a parallel emission direction, and generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the generating comprises: using a first input for the first input channel; using a second input for the second input channel; using a first branch element connecting the first input to a first signal path for the first sound transducer and to a second signal path for the second sound transducer; or using a second branch element connecting the second input to a third signal path for the third sound transducer and to a fourth signal path for the fourth sound transducer, wherein at least one signal path of the first signal path and the second signal path or at least one signal path of the third signal path and the fourth signal path comprises a phase shifter, and wherein the first signal path comprises a first plurality of bandpass filters and the second signal path comprises a second plurality of bandpass filters, wherein the first plurality of bandpass filters or the second plurality of bandpass filters are configured orthogonal to one another, such that a bandpass channel of the first plurality of bandpass filters comprises a frequency pass band that corresponds to a frequency stop band in the second plurality of bandpass filters, or generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the generating comprises generating one or several side signals from the first input channel and the second input channel, and determining the first control signal, the second control signal, the third control signal and the fourth control signal by using the one or several side signals, or generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the generating comprises: generating at least one further side signal; and combining the further side signal with the other left channel and the right channel before branching into two respective signal paths or after branching into the respective signal paths, or generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, generating comprises: generating a first side signal and a second side signal from the first input channel and the second input channel; first combining the first side signal with the first input channel; second combining the second side signal with the second input channel; branching an output signal of the first combining into a first signal path for the first control signal and into a second signal path for the second control signal; and branching an output signal of the second combining into a third signal path for the third control signal and into a fourth signal path for the fourth control signal.

22. Method for operating a signal processor with a first input for a first input channel and a second input for a second input channel, comprising:

generating, from the first input channel and the second input channel, a first control signal for a first sound transducer and a second control signal for a second sound transducer on a first side of a sound generator, and a third control signal for a third sound transducer and a fourth control signal for a fourth sound transducer on a second side of the sound generator; and outputting, via a wired or wireless interface, the first control signal, the second control signal, the third control signal and the fourth control signal, wherein the method further comprises generating a first side signal and a second side signal from the first input channel and the second input channel; first combining the first side signal with the first input channel; second combining the second side signal with the second input channel; branching an output signal of the first combining into a first signal path for the first control signal and into a second signal path for the second control signal; and branching an output signal of the second combining into a third signal path for the third control signal and into a fourth signal path for the fourth control signal, or wherein a first signal path for the first control signal comprises a first plurality of bandpass filters and a second signal path for the second control signal comprises a second plurality of bandpass filters, wherein the first plurality of bandpass filters and the second plurality of bandpass filters are formed orthogonally to one another, such that a bandpass channel of the first plurality of bandpass filters comprises a frequency pass band that corresponds to a frequency stop band in the second plurality of bandpass filters, or wherein a first signal path for the first control signal comprises a first plurality of bandpass filters, wherein a second signal path for the second control signal comprises a second plurality of bandpass filters, wherein a third signal path for the third control signal comprises the first plurality of bandpass filters, and wherein a fourth signal path for the fourth control signal comprises the second plurality of bandpass filters, wherein the first plurality of bandpass filters comprise even bandpass filters and a second plurality of bandpass filters comprise odd bandpass filters.

23. A non-transitory digital storage medium having a computer program stored thereon to perform, when said computer program is run by a computer, a method for operating a sound generator with a first sound generator element on a first side and a second sound generator element on a second side, the method comprising:

emitting sound by a first sound transducer and a second sound transducer in the first sound generator element, such that sound emission directions of the first sound transducer and the second sound transducer are parallel or deviate by less than 30° from a parallel emission direction;

emitting sound by a third sound transducer and a fourth sound transducer in the second sound generator element, such that sound emission directions of the third sound transducer and the fourth sound transducer are parallel to one another or deviate by less than 30° from a parallel emission direction; and generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the generating comprises: using a first input for the first input channel; using a second input for the second input channel; using a first branch element connecting the first input to a first signal path for the first sound transducer and to a second signal path for the second sound transducer; or using a second branch element connecting the second input to a third signal path for the third sound transducer and to a fourth signal path for the fourth sound transducer, wherein at least one signal path of the first signal path and the second signal path or at least one signal path of the third signal path and the fourth signal path comprises a phase shifter, and wherein the first signal path comprises a first plurality of bandpass filters and the second signal path comprises a second plurality of bandpass filters, wherein the first plurality of bandpass filters or the second plurality of bandpass filters are configured orthogonal to one another, such that a bandpass channel of the first plurality of bandpass filters comprises a frequency pass band that corresponds to a frequency stop band in the second plurality of bandpass filters, or generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the generating comprises generating one or several side signals from the first input channel and the second input channel, and determining the first control signal, the second control signal, the third control signal and the fourth control signal by using the one or several side signals, or generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, wherein the generating comprises: generating at least one further side signal; and combining the further side signal with the other left channel and the right channel before branching into two respective signal paths or after branching into the respective signal paths, or generating, from a first input channel and from a second input channel, a first control signal for the first sound transducer, a second control signal for the second sound transducer, a third control signal for the third sound transducer and a fourth control signal for the first sound transducer, wherein the first control signal and the second control signal are out of phase, or wherein the third control signal and the fourth control signal are out of phase, or wherein the first to fourth control signals comprise a frequency range between 500 Hz and 1500 Hz, generating comprises: generating a first side signal and a second side signal from the first input channel and the second input channel; first combining the first side signal with the first input channel; second combining the second side signal with the second input channel; branching an output signal of the first combining into a first signal path for the first control signal and into a second signal path for the second control signal; and branching an output signal of the second combining into a third signal path for the third control signal and into a fourth signal path for the fourth control signal.

24. A non-transitory digital storage medium having a computer program stored thereon to perform, when said computer program is run by a computer, a method for operating a signal processor with a first input for a first input channel and a second input for a second input channel, the method comprising:

generating, from the first input channel and the second input channel, a first control signal for a first sound transducer and a second control signal for a second sound transducer on a first side of a sound generator, and a third control signal for a third sound transducer and a fourth control signal for a fourth sound transducer on a second side of the sound generator; and outputting, via a wired or wireless interface, the first control signal, the second control signal, the third control signal and the fourth control signal, wherein the method further comprises generating a first side signal and a second side signal from the first input channel and the second input channel; first combining the first side signal with the first input channel; second combining the second side signal with the second input channel; branching an output signal of the first combining into a first signal path for the first control signal and into a second signal path for the second control signal; and branching an output signal of the second combining into a third signal path for the third control signal and into a fourth signal path for the fourth control signal, or wherein a first signal path for the first control signal comprises a first plurality of bandpass filters and a second signal path for the second control signal comprises a second plurality of bandpass filters, wherein the first plurality of bandpass filters and the second plurality of bandpass filters are formed orthogonally to one another, such that a bandpass channel of the first plurality of bandpass filters comprises a frequency pass band that corresponds to a frequency stop band in the second plurality of bandpass filters, or wherein a first signal path for the first control signal comprises a first plurality of bandpass filters, wherein a second signal path for the second control signal comprises a second plurality of bandpass filters, wherein a third signal path for the third control signal comprises the first plurality of bandpass filters, and wherein a fourth signal path for the fourth control signal comprises the second plurality of bandpass filters, wherein the first plurality of bandpass filters comprise even bandpass filters and a second plurality of bandpass filters comprise odd bandpass filters.

* * * * *